UNITED STATES PATENT OFFICE.

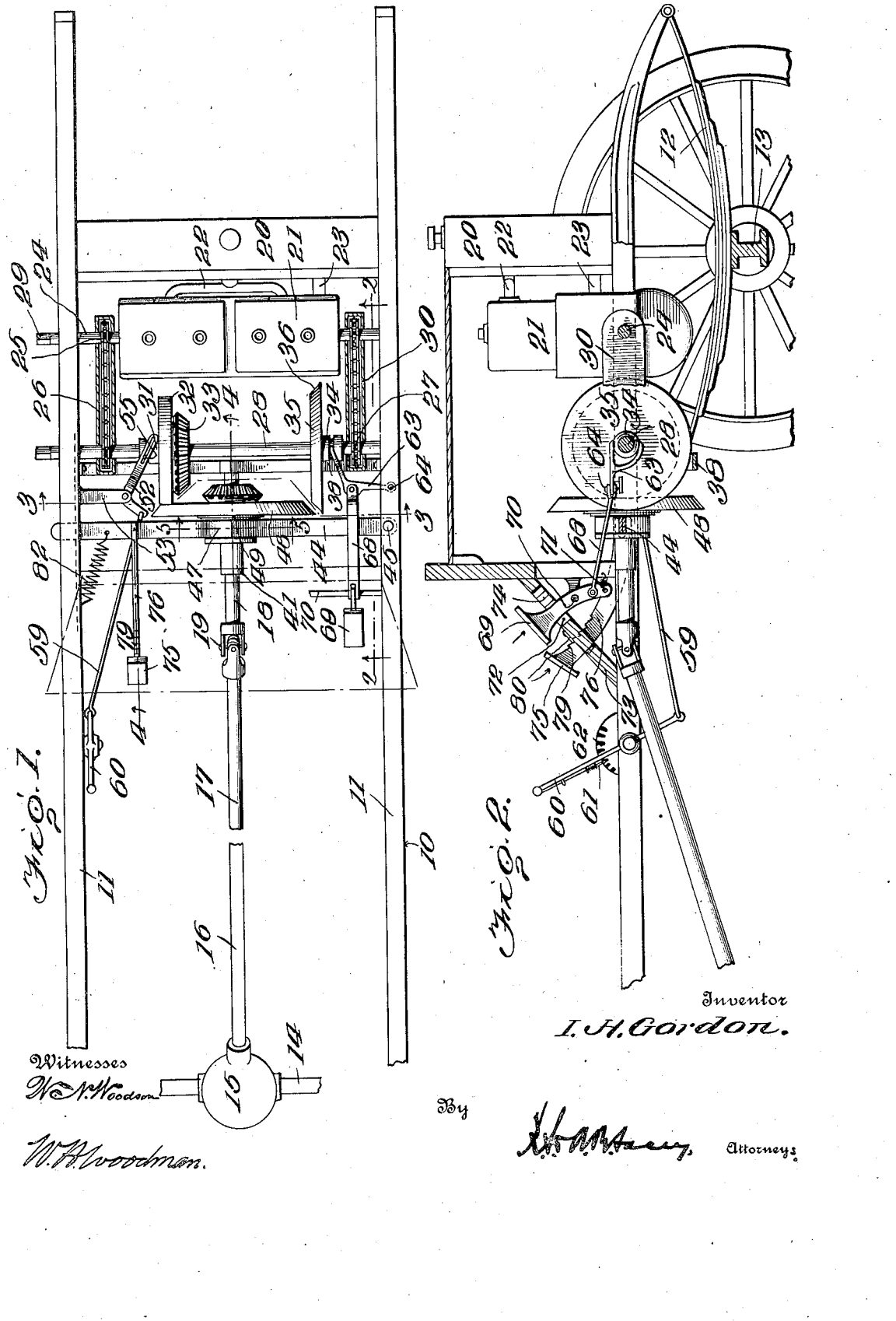

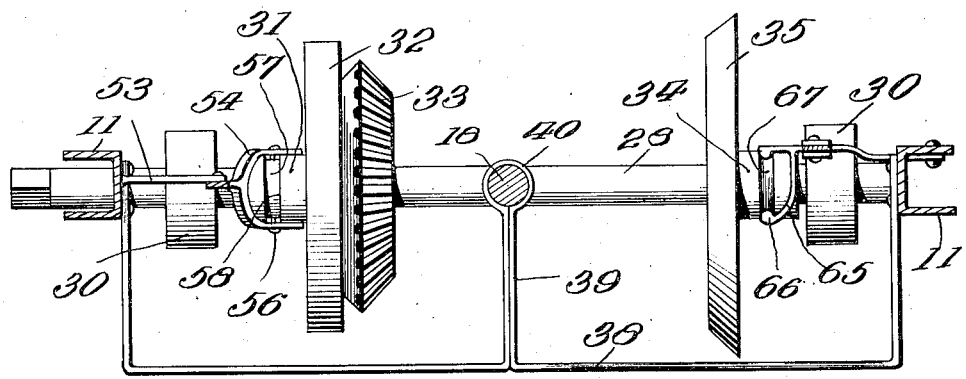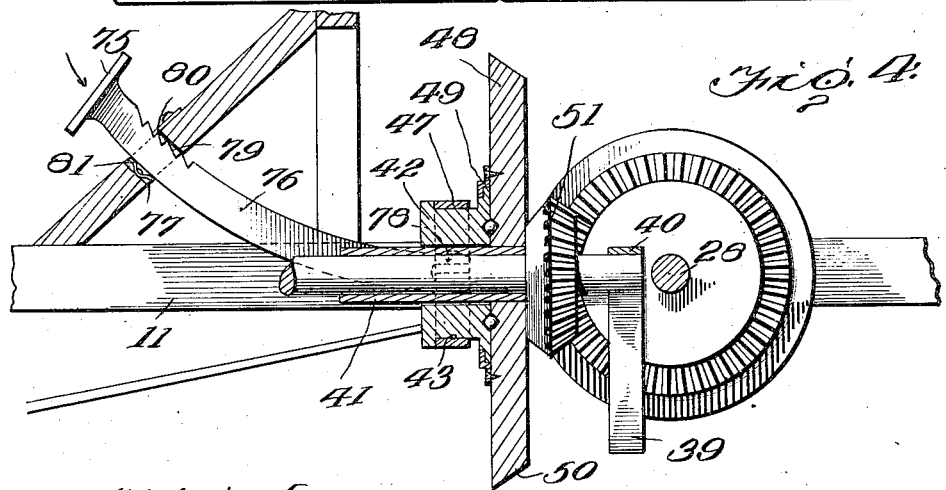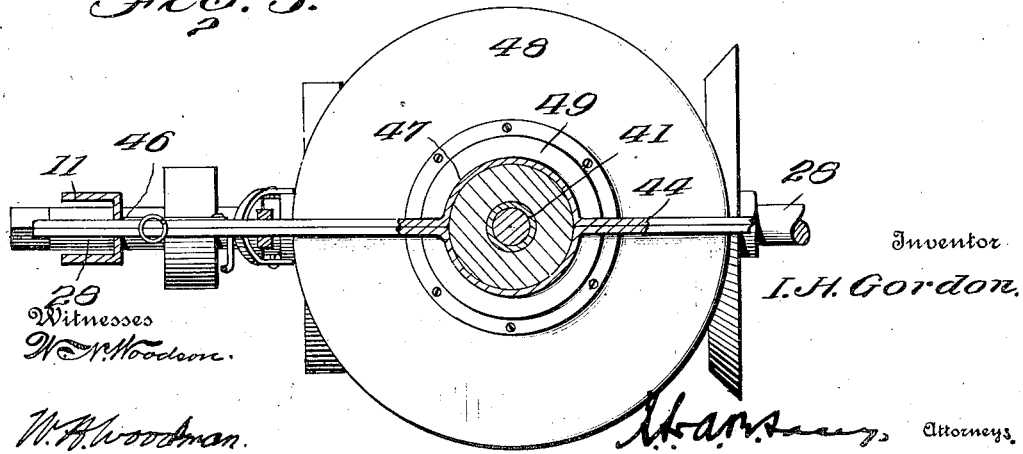

IPHUS H. GORDON, OF LYNDONVILLE, VERMONT, ASSIGNOR OF ONE-HALF TO NATHAN A. NORTON, OF LYNDONVILLE, VERMONT.

FRICTION-DRIVE FOR AUTOMOBILES.

1,174,064.      Specification of Letters Patent.      Patented Mar. 7, 1916.

Application filed August 4, 1914. Serial No. 854,999.

*To all whom it may concern:*

Be it known that I, IPHUS H. GORDON, citizen of the United States, residing at Lyndonville, in the county of Caledonia and State of Vermont, have invented certain new and useful Improvements in Friction-Drives for Automobiles, of which the following is a specification.

My invention relates to new and useful improvements in transmission mechanisms for self-propelled vehicles, the primary object of my invention being the provision of an improved form of friction gear transmission.

In this connection, a further object of my invention is to provide the vehicle with a multiple cylinder gas engine of the usual, or any preferred type, which, instead of being mounted longitudinally of the vehicle, as is now customary, is mounted transversely of the vehicle. This arrangement is of value in that it insures more uniform circulation of water through the cooling jacket of the engine and of oil to the various bearings, irrespective of the length or inclination of the grades over which the vehicle travels.

A further object of my invention is to provide a transmission gearing in which power is transmitted from the transverse crank shaft of the engine, by one or more drive chains, to a transversely mounted jack shaft carrying forward and reverse drive friction wheels and a direct drive bevel wheel, power being transmitted from this jack shaft to a drive shaft operatively connected to a differential mechanism by bringing one or the other of the friction wheels into engagement with a friction disk carried by the drive shaft or by bringing the bevel gear of the jack shaft into mesh with a bevel gear carried by the drive shaft.

In friction gear transmissions, as now commonly used, the drive is from a friction disk to a friction wheel rather than from a friction wheel to a friction disk, although this latter form of power transmission is more efficient as preventing uneven wear of the friction wheel, caused by slippage when throwing in the clutch. Furthermore, it does away with the necessity of a second jack shaft and of one or more universal joints.

A still further object of my invention consists in the provision of a novel form of compound bearing or support for the drive shaft, whereby the friction disk and bevel gear carried thereby may be moved longitudinally of the shaft to bring them into and out of engagement with the friction wheels and bevel gear of the jack shaft.

In this connection, a still further object of my invention consists in the provision of novel and simple mechanisms for selectively bringing either friction wheel into proper engagement with the friction disk or for bringing the bevel gears into mesh with each other, all of these mechanisms being so arranged that the proper drive members may be automatically locked in active position.

With these and other objects in view, my invention will be more fully described, illustrated in the accompanying drawings, and then specifically pointed out in the claims which are attached to and form a part of this application.

In the drawings: Figure 1 is a top plan view of the running gear of a conventional form of motor vehicle, showing my improved friction transmission mechanism in place, the housings for the drive chains being shown in section; Fig. 2 is a longitudinal vertical sectional view of the running gear of the vehicle with my improved transmission gearing in place, this section being taken on the line 2—2 of Fig. 1; Fig. 3 is a transverse, vertical sectional view, taken on the line 3—3 of Fig. 1, looking in the direction of the arrows and showing certain details in the controlling mechanism for the friction wheels and also illustrating one of the bearings for the drive shaft; Fig. 4 is a fragmentary sectional view taken on the line 4—4 of Fig. 1, illustrating other details of driving shaft support; Fig. 5 is a transverse sectional view taken on the line 5—5 of Fig. 1, still further illustrating the manner of supporting the drive shaft and the friction disk and bevel gear carried thereby.

Corresponding and like parts are referred to in the following description and indicated in all the views of the drawings by the same reference characters.

In order to insure a clear understanding of the various features of construction and the coöperation of different parts, I have illustrated my invention in connection with a conventional vehicle frame 10 including the side frame members 11 supported at the front and rear by suitable springs 12 which in turn are secured to the front and rear axles 13 and 14. The rear axle is of any preferred live axle type and includes a bevel gear differential mechanism 15 to which is operatively connected the longitudinally extending drive shaft 16 including a rear shaft section 17 and forward shaft section 18 connected by a universal joint 19, this latter shaft section 18 being journaled in suitable bearings, as will be later more fully pointed out.

The vehicle frame, at its forward end, carries a radiator 20 of the usual or any preferred type and supported by the frame transversely of the vehicle, and immediately at the rear of the radiator, is a multiple cylinder gas engine, conventionally indicated at 21, the cooling jackets of this gas engine being connected to the radiator by pipes 22 and 23 in the usual well known manner. The crank shaft 24 of this engine is preferably journaled in suitable bearings carried by the side frame members and carries at either side of the engine a sprocket wheel 25. Sprocket chains 26 are trained over these sprocket wheels and over sprocket wheels 27 carried by a jack shaft 28 which is also journaled in bearings carried by the side frame members of the car, the jack shaft extending in parallel spaced relation to the crank shaft 24. One end of the crank shaft and also one end of the jack shaft are extended beyond the side of the vehicle and provided with squared terminals 29 adapted to receive a hand crank by means of which the engine may be started. It will therefore be seen that rotation of either the crank shaft 24 or jack shaft 28 will start the engine, either one being employed as is found more convenient, due to body design of the vehicle. To facilitate this dual method of cranking, the sprocket wheels of the crank shaft and of the jack shaft should be of uniform size. Fluid tight housings or casings 30 surround the sprocket chains and their sprockets in order that the chains may run in oil and also to prevent accumulation of dirt and grit which would otherwise wear the chains out.

A shipper collar 31 is keyed or otherwise mounted against turning movement while left free for reciprocatory movement upon the jack shaft 28 and carries a friction wheel 32 to which is bolted, upon its inner face, a bevel gear 33. A second shipper collar 34 is also mounted in like manner upon the jack shaft 28 and carries a second friction wheel 35 having a bevel peripheral edge 36.

Secured by its upturned ends to the side frame members 11, directly at the rear of the jack shaft 28, is a U-shaped bracket 38 which extends at a level below the peripheral edges of the friction wheels and which has its intermediate portion extended upwardly as shown at 39 and looped to form a bearing 40 for the free forward end of the drive shaft section 18. Keyed or otherwise secured for reciprocation upon this drive shaft section, is a sleeve 41 which is held against turning movement independent of the shaft section and which carries a collar 42 provided peripherally with a groove 43, this collar being loosely mounted upon the sleeve and in fact forming a second bearing for the shaft section. As a means for supporting this latter bearing, I provide superimposed, transversely extending supporting bars 44 which are pivotally mounted at one end to one of the frame members 11 as shown at 45 in Fig. 1 and which are slidably mounted at their other ends in a longitudinal slot 46 formed in the other side frame member. The intermediate portions of these bars are oppositely bowed to form an eye 47 engaging in the groove 43. It will therefore be seen that swinging of that end of the bars extending through the slot 46 will serve to advance or retract the collar 42. A friction disk 48 is keyed or otherwise reciprocally mounted upon the sleeve 41 directly in advance of the collar 42 and the abutting faces of this disk and collar are grooved to receive a thrust bearing 49. The friction disk is provided with a bevel peripheral edge 50 adapted to be engaged by the bevel edge of the friction wheel 35 and the disk also carries a bevel gear 51 adapted, under certain circumstances, to mesh with the bevel gear 33. Preferably one, and in some instances, both of these bevel gears are formed of pressed rawhide or other similar material in order to render the gears as silent in their action as possible.

As a means for reciprocating the friction wheel 32, and consequently the bevel gear 33, I provide a bell crank lever 52 which is pivoted intermediate its length upon a bracket 53 carried by the vehicle frame and which is provided at one end with vertically spaced arms 54 having slots 55 to receive pins 56 carried by a collar 57 which is mounted to turn in a groove 58 formed in the sleeve or collar 31. A rod 59 pivotally connects the free end of the bell crank lever with one end of a hand lever 60 which is pivoted intermediate its length to the side of the vehicle frame and which is provided with a spring pressed hand latch 61 coacting with the notched sector 62.

The friction wheel 35 is reciprocated upon the jack shaft 28 by means of a lever 63 pivoted at one end to the frame as shown at 64 and having its other end bifurcated to provide fork arms 65 having terminals 66 which seat in a groove 67 of the collar or sleeve 34. A link 68 pivotally connects the intermediate portion of this lever with the lower end of a foot pedal 69 which is pivoted intermediate its length as shown at 70, a spring 71 normally tending to hold the foot pedal in such a position as to maintain the friction wheel 35 in inoperative position. This foot pedal extends through a slot 72 formed in the foot board 73 of the vehicle and one edge portion of this slot is notched to provide ratchet teeth 74 adapted to engage the pedal when the latter is swung forwardly to lock the friction wheel in its innermost position, the pedal being releasable from these notches by slight side pressure.

In order to provide for longitudinal reciprocation of the collar 42, and consequently of the friction disk 48 and gear 51, I provide a foot pedal 75 having an arcuate shank 76 slidable through a slot 77 in the foot board and terminating in spaced fingers 78 straddling the bars 44 to which they are loosely pivoted. This shank, where it passes through the slot, is notched to provide ratchet teeth 79 for engagement by a keeper 80 and a leaf spring 81 serves to normally maintain the pedal shank in such position as to be automatically locked. However, slight pressure against the upper edge of the pedal will at any time release it and permit its return movement. A helical spring 82 is secured to the frame of the vehicle and to the slidable end of the bars 44 and serves as a means for drawing such bars, together with the friction wheel and gear, rearwardly.

From the foregoing description, taken in connection with the drawings, the operation of my improved friction gear transmission mechanism will be readily understood. Under normal conditions, that is, when the vehicle is at rest, both friction wheels 33 and 35 are moved outwardly beyond the peripheral edge of the friction disk 48 and the friction disk itself is in rearmost position, that is, at the rear of the transverse plane of the peripheral edge of the friction wheel 32. Under these conditions, the engine may be cranked without transmitting any power to the rear axle. When started, the hand lever 60 is manipulated to bring the friction wheel 32 to substantially the position shown in Fig. 1 of the drawings and pressure is applied to the foot pedal 75, which may well be termed the clutch pedal, to force the friction disk 48 into engagement with the friction wheel 32, this being the lowest speed drive of the vehicle. From time to time the speed may be gradually increased by slightly retracting the friction disk by means of the clutch pedal, manipulating the lever 60 to move the friction wheel 32 closer to the center of the jack shaft and again forcing the friction disk 48 into engagement therewith. When sufficient headway has been attained, a direct drive may be had by repetition of the above operation, the friction wheel 32 being then moved in such a manner as to bring the bevel gears 33 and 51 into mesh. It will of course be clear that the vehicle may, when at rest, be started in the reverse direction, by proper manipulation of the foot pedal 69 and clutch pedal 75.

Although I have illustrated and described my invention in all its details, it will of course be understood that I reserve the right to make any changes, within the scope of the appended claims, without in the slightest degree departing from the spirit of my invention.

Having thus described the invention, what is claimed as new is:

1. The combination with a transversely disposed motor shaft, of a longitudinally extending drive shaft, and means for transmitting power from the motor shaft to the drive shaft, said means including sprockets mounted on the motor shaft, a transverse horizontal jack shaft, sprockets on the jack shaft, chains trained over the sprockets of the motor shaft and jack shaft, a friction wheel slidably mounted on the jack shaft to rotate therewith, and a friction disk operatively mounted on the drive shaft.

2. The combination with a transversely disposed motor shaft, of a longitudinally extending drive shaft, and means for transmitting power from the motor shaft to the drive shaft, said means including sprockets mounted on the motor shaft, a transverse horizontal jack shaft, sprockets on the jack shaft, chains trained over the sprockets of the motor shaft and jack shaft, a friction wheel slidably mounted on the jack shaft to rotate therewith, a sleeve reciprocally mounted on the drive shaft to rotate therewith, a friction disk carried by the sleeve, and means for normally holding the friction disk in engagement with the friction wheel.

3. The combination with a transversely disposed motor shaft, of a longitudinally extending drive shaft, and means for transmitting power from the motor shaft to the drive shaft, said means including sprockets mounted on the motor shaft, a transverse horizontal jack shaft, sprockets on the jack shaft, chains trained over the sprockets of the motor shaft and jack shaft, a friction wheel slidably mounted on the jack shaft to rotate therewith, a sleeve reciprocally mounted on the drive shaft to rotate therewith, a friction disk carried by the sleeve, and means for normally holding the friction disk in engagement with the friction wheel, said means including a pedal operatively connected to the sleeve, and means for locking the pedal.

4. The combination with a horizontal transverse motor shaft, of a longitudinal drive shaft, and means for transmitting power from the motor shaft to the drive shaft, said means including a friction disk carried by the drive shaft, a horizontal transverse jack shaft, a friction wheel movable longitudinally of the jack shaft across the face of the friction disk, and positive drive connection between the jack shaft and motor shaft.

5. The combination with a drive shaft, of a jack shaft, means for transmitting power to the jack shaft, a friction disk carried by the drive shaft, a bevel gear carried by the friction disk, means for advancing or retracting the disk and gear, and means carried by the jack shaft for transmitting power to the disk or to the gear.

6. The combination with a drive shaft, of a jack shaft, means for transmitting power to the jack shaft, a friction disk carried by the drive shaft, a bevel gear carried by the friction disk, means for advancing or retracting the disk and gear, and means carried by the jack shaft for transmitting power to the disk or to the gear, said means including a friction wheel and bevel gear carried by the friction wheel, and means for reciprocating the wheel and gear along the jack shaft.

7. In a transmission mechanism for vehicles, the combination with a drive shaft, of a jack shaft, a friction disk mounted for reciprocation along the drive shaft, friction wheels mounted for reciprocation along the jack shaft, and mechanisms for reciprocating the disk and wheels, one of the disks being adapted to engage peripherally against one side of the forward face of the disk, while the other has a bevel peripheral edge to engage against the opposite side of the friction disk which also has a bevel peripheral edge.

8. The combination with a vehicle frame, of a drive shaft, a support for the drive shaft pivoted to one side of the frame and slidably mounted upon the other side, a friction disk reciprocally mounted on the drive shaft and movable forwardly or rearwardly through swinging of the supporting member, a jack shaft, means for transmitting power to the jack shaft, and means for transmitting power from the jack shaft to the friction disk.

9. The combination with a vehicle frame, of a drive shaft, a support for the drive shaft pivoted to one side of the frame and slidably mounted upon the other side, a friction disk reciprocally mounted on the drive shaft and movable forwardly or rearwardly through swinging of the supporting member, a jack shaft, means for transmitting power to the jack shaft, and means for transmitting power from the jack shaft to the friction disk, said latter means including friction wheels reciprocally mounted upon the jack shaft, and means for selectively reciprocating either friction wheel to bring it into engagement with the disk.

10. The combination with a vehicle frame, of a drive shaft, a support for the drive shaft pivoted to one side of the frame and slidably mounted upon the other side, a friction disk reciprocally mounted on the drive shaft and movable forwardly or rearwardly through swinging of the supporting member, a jack shaft, means for transmitting power to the jack shaft, and means for transmitting power from the jack shaft to the friction disk, said latter means including friction wheels reciprocally mounted upon the jack shaft, and means for selectively reciprocating either friction wheel to bring it into engagement with the disk, one of the friction wheels being movable across the forward face of the disk.

11. The combination with a vehicle frame, of a drive shaft, a support for the drive shaft pivoted to one side of the frame and slidably mounted upon the other side, a friction disk reciprocally mounted on the drive shaft and movable forwardly or rearwardly through swinging of the supporting member, a jack shaft, means for transmitting power to the jack shaft, and means for transmitting power from the jack shaft to the friction disk, said latter means including friction wheels reciprocally mounted upon the jack shaft, and means for selectively reciprocating either friction wheel to bring it into engagement with the disk, one of the friction wheels being movable across the forward face of the disk, a bevel gear carried by said latter friction wheel, and a co-acting bevel gear carried by the disk.

In testimony whereof I affix my signature in presence of two witnesses.

IPHUS H. GORDON. [L. S.]

Witnesses:
  FRED H. LYNDS,
  N. A. NORTON.